United States Patent

Van Swam et al.

Patent Number: 5,854,818
Date of Patent: *Dec. 29, 1998

[54] ZIRCONIUM TIN IRON ALLOYS FOR NUCLEAR FUEL RODS AND STRUCTURAL PARTS FOR HIGH BURNUP

[75] Inventors: Leonard F. P. Van Swam, Richland, Wash.; Friedrich Garzarolli, Höchstadt, Germany; Heinrich Ruhmann, Herzogenaurach, Germany

[73] Assignee: Siemens Power Corporation, Richland, Wash.

[*] Notice: The term of this patent shall not extend beyond the expiration date of Pat. No. 5,835,550.

[21] Appl. No.: 919,452

[22] Filed: Aug. 28, 1997

[51] Int. Cl.$^6$ .............................. G21C 3/07; C22C 16/00
[52] U.S. Cl. ..................... 376/409; 376/416; 376/457; 148/672; 420/422
[58] Field of Search ................... 376/409, 414, 376/416, 419, 457; 148/421, 672; 420/422

[56] References Cited

U.S. PATENT DOCUMENTS

| | | | |
|---|---|---|---|
| 5,254,308 | 10/1993 | Garde et al. | 420/422 |
| 5,702,544 | 12/1997 | Mardon et al. | 148/672 |
| 5,712,888 | 1/1998 | Adamson et al. | 376/416 |
| 5,735,978 | 4/1998 | Mardon et al. | 148/672 |

*Primary Examiner*—Charles T. Jordan
*Assistant Examiner*—M. J. Lattig
*Attorney, Agent, or Firm*—Ira Lee Zebrak, Esq.

[57] ABSTRACT

Zirconium alloys for use in an aqueous environment subject to high fluence of a water reactor and characterized by improved corrosion resistance, consisting essentially of 0.3 to 1.8 weight percent tin, 0.1 to 0.65 weight percent iron, the balance of alloys being essentially nuclear grade zirconium with incidental impurities and having a microstructure of $Zr_3Fe$ second phase precipitates distributed uniformly intragranularly and intergranularly to form radiation resistant second phase precipitates in the alloy matrix.

15 Claims, 3 Drawing Sheets

ZIRCONIUM TIN IRON ALLOYS FOR NUCLEAR FUEL RODS AND STRUCTURAL PARTS FOR HIGH BURNUP

FIELD OF THE INVENTION

The present invention relates generally to nuclear reactors, and more particularly to nuclear fuel rod cladding for nuclear fuel rods and to structural parts for use in a nuclear fuel assembly or the reactor core.

BACKGROUND OF THE INVENTION

Zirconium alloys have in the past found widespread use in nuclear reactor applications, including nuclear fuel rod cladding, nuclear fuel assembly components, and reactor core components. Such alloys include Zircaloy-2 and Zircaloy-4 which are dilute zirconium-tin alloys with additions of chromium and iron, and controlled amounts of oxygen, silicon and carbon, and in addition in the case of Zircaloy-2, nickel. Zircaloy-2 and Zircaloy-4 are used mainly in United States and European designed light water reactors, particularly boiling water reactors (BWR) and pressurized water reactors (PWR).

Other zirconium alloys containing niobium as a major alloying component have commonly been used in Russian and Canadian reactors. A binary zirconium niobium alloy, typically containing 1% niobium, has been used extensively in Russian nuclear reactors, and zirconium alloyed with 2.5 to 2.8% niobium is used for pressure tubes in Canadian designed reactors. Binary zirconium-niobium alloys have shown to be susceptible to a type of nodular-like corrosion wherein patches of thick oxide of 100 microns or more develop on the metal in areas with much thinner oxide typically not more than 20–30 microns. This nodular-like corrosion first appears on fuel rod cladding made of these alloys at intermediate to high burnup and is enhanced by the presence of dissolved oxygen in the coolant water. The very high corrosion rate that develops in the nodule areas is highly undesirable since it can threaten the integrity of fuel rods and other structural parts when further irradiated in the reactor. Since BWRs in general operate with relatively high levels of dissolved oxygen in the coolant, and PWRs occasionally experience coolant oxygen excursions during operation, binary zirconium-niobium alloys have not been used commercially in U.S. or European reactors. More recently, quaternary zirconium alloys comprising zirconium, tin, niobium, and a third alloying element, typically iron, have been used, but to a lesser extent than Zircaloy-2 and Zircaloy-4, in nuclear fuel rod cladding tubes and structural parts for nuclear fuel assemblies in U.S. and European PWRs and in Russian reactors.

In general, the above described alloys have served their intended purpose well. However, with the increased demand on nuclear fuel assemblies and reactor core components, particularly nuclear reactor fuel rods, and more particularly nuclear fuel rod cladding to achieve fuel burnup of 60–70 MWd/KgU and higher, the corrosion performance of these alloys has been less than adequate. Specifically, nodular corrosion, uniform corrosion, and/or accelerated corrosion of these alloys at high burnup of 60–70 MWd/KgU renders their performances less than desirable. Further exacerbating the corrosion performance of these alloys has been the increasing fuel cycle duty demands placed upon modern fuel. Fuel cycle lengths have been increased from 10 or 12 months, typical until a few years ago, to approximately 18 or even 24 months in newer reactor core management schemes. The average coolant temperature has been raised in some nuclear power plants and the longer fuel cycles, protection from stress corrosion cracking of stainless steel pipes and parts in the nuclear steam supply systems and personnel radiation protection considerations have all demanded changes in coolant water chemistry.

Specifically, accelerated corrosion at high burnup in excess of approximately 50 MWd/KgU of the zircaloys and the susceptibility to nodular corrosion of zircaloys in oxygenated reactor coolant as well as the susceptibility to nodular-like corrosion at a burnup above approximately 45 MWd/KgU of the binary zirconium niobium alloys renders their performance at high burnup of 60–70 MWd/KgU marginal to unacceptable.

Currently employed alloys for nuclear fuel rod cladding and fuel assembly structural parts at burnups exceeding approximately 35 to 50 MWd/kgU are subject to accelerated corrosion which leads to very rapid increases in oxide thickness and results in high hydrogen absorption by the material which may lead to unacceptable loss of ductility due to hydride formation. Depending on the particular alloy composition, the heat treatment(s) received during fabrication, and the reactor operating conditions, the corrosion rate may rapidly become very high rendering nuclear fuel rod cladding tubes, fuel assembly structural parts and other reactor core components made from these alloys unsuitable for use at high burnup of 60–70 MWd/kgU or higher.

Accelerated corrosion of the Zircaloys occurs at high fuel burnup as a result of an increase during high burnup in the corrosion rate. The corrosion resistance of zirconium alloys for light water reactor use depends in part on the presence of second phase particles or precipitates in the alloy. For example, the Zircaloys consist of a solid solution of tin in zirconium and second phase precipitates of zirconium-transition metal intermetallic compounds. A commonly found precipitate in Zircaloy-2 is $Zr_2$ (Fe,Ni), a so-called Zintl phase, which is derived from and has the crystal structure of $Zr_2Ni$ wherein a portion of the nickel has been replaced by iron to form the intermetallic. Another commonly found precipitate in Zircaloy-2 as well as in Zircaloy-4 is $Zr(Cr,Fe)_2$, a so-called Laves phase, which is derived from and has the crystal structure of $ZrCr_2$ wherein a portion of the chromium has been replaced by iron. Similarly, quaternary zirconium tin niobium iron alloys contain precipitates with various compositions and combinations of zirconium, niobium and iron. Depending on heat treatment and possibly other processing variables, the following precipitates have been known to occur: orthorhombic $(ZrNb)_3Fe$, body centered tetragonal $(ZrNb)_2Fe$, close-packed hexagonal $Zr (FeNb)_2$ and $(ZrNb)_3Fe$ as well as beta-zirconium (a solid solution of approximately 19% niobium and 81% zirconium) and beta-niobium (a solid solution of approximately 7.8% zirconium and 92.2% niobium). Binary zirconium - niobium alloys with 1% and 2.5% niobium respectively, contain, depending on heat treatment, precipitates of beta-zirconium or beta-niobium.

The second phase precipitates described above play an important role in the corrosion behavior of the alloy in which it is formed. In addition, both the average precipitate size and the precipitate distribution (i.e. interparticle spacing) significantly effect the corrosion properties of the above alloys. At the prevailing reactor operating temperatures, each of the second phase precipitates in the above zirconium alloys containing iron in combination with metals other than zirconium are unstable in a neutron irradiation field. After a sufficiently long in-reactor residence time, the second phase precipitates dissolve in the alloy matrix leading to a decrease in the average precipitate size and an increase in interparticle spacing, and raise the level of alloying elements and particularly iron dissolved in the matrix.

The changes in average size and average density of second phase precipitates and the increase in the amount of dissolved alloying element from the precipitate into the matrix with increased burnup lead to an increase in the corrosion rate of the Zircaloys, and the quaternary zirconium-tin-niobium-iron alloys at intermediate to high burnup. Depending on the particular alloy composition, the reactor operating conditions, and the heat treatments received by the alloy or the reactor component made of the alloy during fabrication, the corrosion rate of these alloys, may become very high rendering nuclear fuel rod cladding, nuclear fuel assembly parts, and reactor core components made from these alloys unsuitable for use at high burnup.

This is demonstrated, for example, by FIGS. 1 and 2 where the corrosion rate, the precipitate density and the precipitate average size are plotted as a function of fluence for Zircaloy-4 irradiated in a pressurized water reactor at approximately 300° C. The average precipitate size was between 0.19 and 0.34 μm before irradiation. The increase in corrosion at about $10 \times 10^{21}$ neutrons per $cm^2$ ($n/cm^2$) fluence (approximately 50 MWd/KgU) occurs when about 50% of the intermetallic second phase precipitates have dissolved and where the average precipitate size has become significantly smaller.

Nodular corrosion which is a form of high temperature water or steam corrosion in which the surface of the material is locally attacked to form small lenticular shaped postules or nodules of significant oxide thickness or depth whereas the surface in between the nodules is corroded only slightly and has formed only a thin oxide thickness layer has most frequently been observed in the Zircaloys in boiling water reactors, and in zirconium niobium alloys exposed to oxygen gas containing water coolant in boiling water reactors, pressurized water reactors, and Russian reactors. Although heat treatments are known which can help to reduce the tendency of the Zircaloys to develop nodular corrosion at high burnup, such heat treatments can lead to performance problems, specifically the early onset of accelerated uniform corrosion described above. Zirconium-niobium binary alloys do not contain tin and for this reason have poor resistance against nodular or nodular-like corrosion in oxygen containing coolants, particularly BWRs, and also in PWRs which occasionally may experience oxygen excursions. Furthermore, there are no known heat treatments for avoiding nodular corrosion attacks of zirconium-niobium binary alloys.

In addition to nodular corrosion, Zircaloy-4 when used in pressurized water reactors frequently suffers from high uniform corrosion rates. When the Zircaloy-4 products are fabricated with a tin level in the upper end of the allowable range of 1.2 to 1.7 weight percent specified in American Society for Testing and Materials Standard B350-93(1993), typically in excess of approximately 1.5 weight percent, the material suffers from high uniform corrosion rates, particularly when used in high coolant temperature pressurized water reactors that employ low neutron leakage fuel cycles. It is also observed that a high uniform corrosion rate can lead to an early onset of accelerated corrosion as described above. Although the extent of the uniform corrosion can be partially limited by limiting the tin content to be near the lower end of the allowable range, at high burnup the corrosion of such low tin Zircaloy is nonetheless too high and results in inadequate design margin in most cases.

It would therefore be an advantage over the prior art to provide an alloy for use in nuclear fuel rod claddings, nuclear fuel assembly components and reactor core parts which overcomes the above-stated disadvantages and which has improved resistance to uniform, accelerated, and nodular corrosion in a light water nuclear reactor up to high burnup.

SUMMARY OF THE INVENTION

The present invention relates to corrosion resistant nuclear reactor components comprising an alloy consisting essentially of 0.3 to 1.8 weight percent tin, 0.1 to 0.65 weight percent iron, 0.003 to 0.015 weight percent of silicon, 0.005 to 0.02 weight percent carbon, and 0.09 to 0.22 weight percent oxygen, the balance of said alloy being essentially nuclear grade zirconium with incidental impurities and imparted with a microstructure of $Zr_3Fe$ second phase precipitates distributed uniformly intragranularly and intergranularly forming radiation resistant second phase precipitates in the alloy matrix so as to result in increased resistance to aqueous corrosion to that of Zircaloy when irradiated to high fluence, and wherein the second phase $Zr_3Fe$ precipitates in said alloy have an average diameter of from about 40 to 300 nm.

In a preferred embodiment, a fuel rod cladding tube for a nuclear reactor fuel rod is provided, comprised of an alloy consisting essentially of 0.3 to 1.8 weight percent tin, 0.1 to 0.65 weight percent iron, the balance of said alloy being essentially nuclear grade zirconium with incidental impurities and having a microstructure of $Zr_3Fe$ second phase precipitates distributed uniformly intragranularly and intergranularly forming radiation resistant second phase precipitates in the alloy matrix so as to result in increased resistance to aqueous corrosion to that of Zircaloy when irradiated to high fluence.

In another preferred embodiment, zirconium alloys for use in an aqueous environment subject to high fluence of a water reactor and characterized by improved corrosion resistance is provided, the alloys consisting essentially of 0.3 to 1.8 weight percent tin, 0.1 to 0.65 weight percent iron, the balance of said alloys being essentially nuclear grade zirconium with incidental impurities and having a microstructure of $Zr_3Fe$ second phase precipitates distributed uniformly intragranularly and intergranularly to form radiation resistant second phase precipitates in the alloy matrix so as to result in increased resistance to aqueous corrosion to that of Zircaloy when irradiated to high fluence.

In yet another preferred embodiment, a structural part for a nuclear reactor fuel assembly is provided, comprising a zirconium alloy consisting essentially of 0.3 to 1.8 weight percent tin, 0.1 to 0.65 weight percent iron, the balance of said alloy being essentially nuclear grade zirconium with incidental impurities and having a microstructure of $Zr_3Fe$ second phase precipitates distributed uniformly intragranularly and intergranularly forming radiation resistant second phase precipitates in the alloy matrix so as to result in increased resistance to aqueous corrosion to that of Zircaloy when irradiated to high fluence.

DETAILED DESCRIPTION

Figure 1:
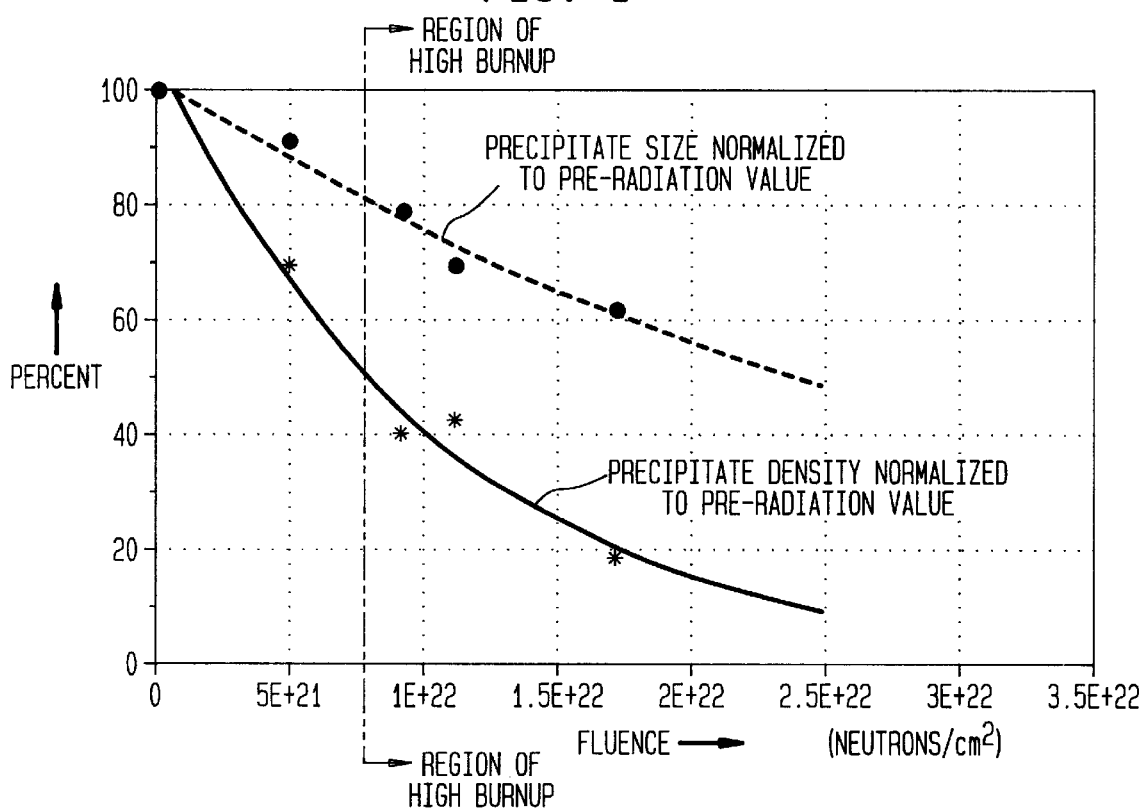
FIG. 1 is a diagram showing the effect of radiation on precipitate size and density of Zircaloy-4 during normal and high burnup in a pressurized water reactor.
Figure 2:
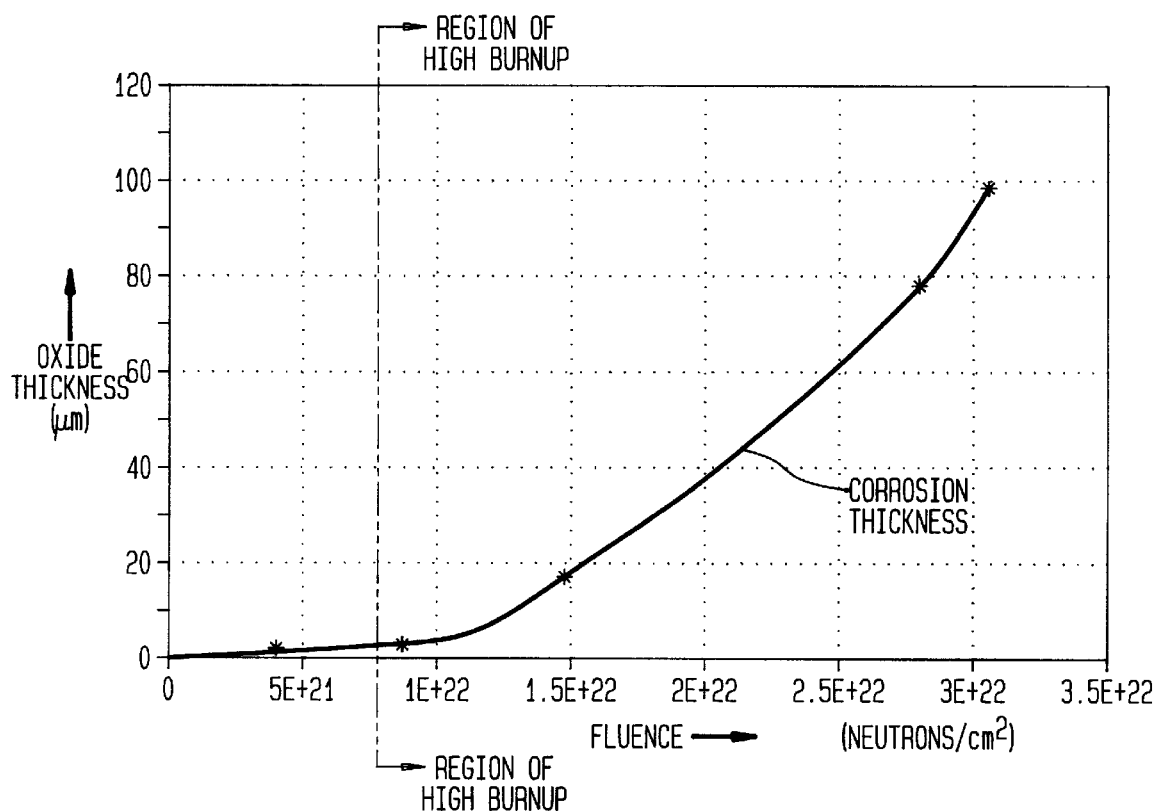
FIG. 2 is a diagram showing the effect of radiation on corrosion of Zircaloy-4 during normal and high burnup in a pressurized water reactor.
Figure 3:
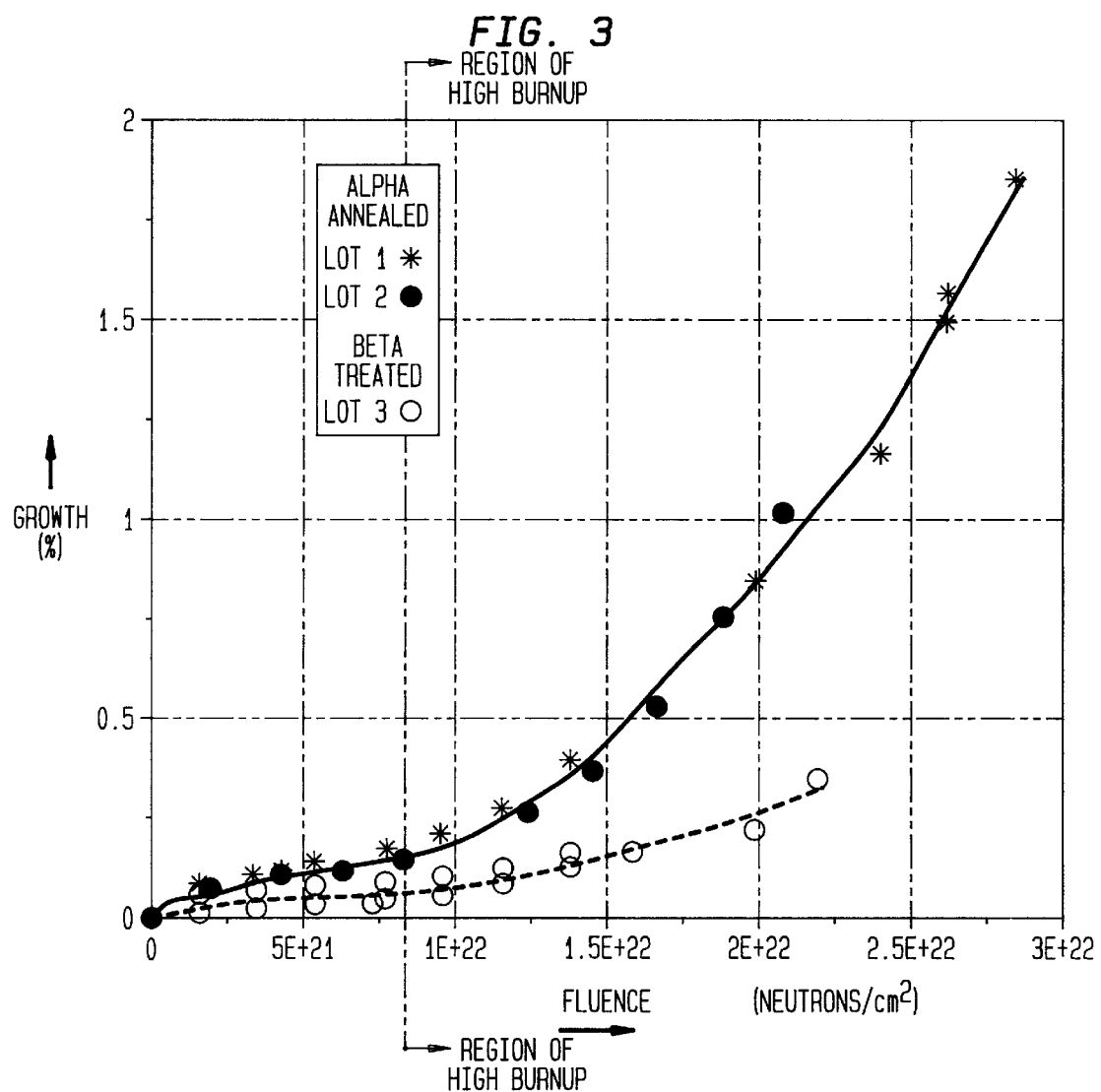
FIG. 3 is a diagram showing the effect of radiation on inducing growth during normal and high burnup of Zircaloy-4 in a boiling water reactor.

In accordance with the present invention, in order to overcome the above-described limitations of the Zircaloys, the zirconium-niobium binary, and quaternary family of alloys, and particularly to provide materials for components for light water nuclear reactor service having superior corrosion resistance for high burnup, new zirconium base alloys intended for use in nuclear fuel rod cladding, as well as structural components of nuclear fuel assemblies and other core components having particular second phase precipitates and imparted with microstructural features have been developed to overcome the shortcomings of the above-described alloys for use in nuclear applications up to and including high burnup. These new zirconium based alloys have demonstrated a generally low corrosion rate and the ability to resist the occurrence of accelerated corrosion and nodular corrosion up to high burnup in boiling and pressurized water reactors.

These zirconium alloys contain 0.3 to 1.8 weight percent tin, 0.1 to 0.65 weight percent iron, the balance of the alloy being nuclear grade zirconium with incidental impurities and have a uniform intergranular and intragranular distribution of small second phase precipitates of $Zr_3Fe$ which provide resistance to corrosion, accelerated corrosion, and nodular corrosion up to high burnup. As will be further discussed below, the presence of tin in the alloys protects against nodular corrosion and the presence of iron in the alloys provides for stable precipitates that aid in maintaining a low uniform corrosion rate at high burnup or large neutron fluence accumulation. These alloys should not contain, except for trace or impurity amounts, other elements such as chromium, molybdenum, vanadium, copper, nickel, tungsten or alloying elements which can result in the formation of second phase precipitates which are unstable at high burnup and result in unacceptable levels of corrosion at high burnup.

In order to obtain the desired improved corrosion performance for use up to high burnup in an aqueous environment of a light water reactor, the alloys or alloy article are processed and heat treated so that the second phase precipitates are uniformly distributed both intergranularly and intragranularly throughout the alloy or the alloy article. The heat treatment and processing of the alloy or alloy article in accordance with the present invention results in uniform intergranular and intragranular distribution of the second phase precipitate particles as contrasted to other heat treatments and processing which only result in a non-uniform distribution of precipitates which occurs at grain boundaries or former beta-grain boundaries and an absence of intragranular precipitates.

To obtain uniform intergranular and intragranular distribution of second phase precipitates for the zirconium-tin-iron alloys of the present invention, the alloy material is heated in the beta range to a temperature greater than about 1000° C., to form a solid solution free of second phase precipitates and is then rapidly quenched to achieve a diffusionless martensitic transformation. When the zirconium-tin-iron alloy is heated to the beta range temperature greater than approximately 1000° C., the alloying elements iron and tin are in a solid solution with the zirconium having a body centered cubic crystal structure. By rapid quenching of the alloy from this beta range temperature, a diffusionless martensitic transformation occurs at least at the surface of the material where the quench rate is highest and which is subject to the corrosion reaction and wherein the body centered cubic crystal structure phase is transformed into an alpha phase having a closed packed hexagonal crystal structure. Because of the diffusionless nature of the martensitic transformation, the alloying elements remain in a supersaturated metastable solution in the alpha phase when rapidly cooled to a temperature below the $\alpha+\beta$ to $\alpha$ transformation temperature (approximately 820–880° C.). Subsequent annealing heat treatments in the alpha phase region at temperatures below approximately 800° C. after the rapid quench from the high temperature beta phase region causes the iron in the alloy to form precipitates of $Zr_3Fe$ particles and subsequent growth into larger size precipitates while retaining a uniform intergranular and intragranular distribution in the zirconium-tin solid solution matrix. The existence of and the uniform intergranular and intragranular distribution of $Zr_3Fe$ precipitates impart excellent corrosion properties to the alloy, and due to the stability of $Zr_3Fe$ in neutron irradiation fields at all commonly encountered temperatures in light water nuclear reactors, there is no deterioration of corrosion properties of the alloy at high burnup or high neutron fluence levels.

In a preferred embodiment, the alloy material is first heated to 1050° C.±20° C. for 20 to 120 minutes to form a solid solution where the iron is completly dissolved in the beta zirconium tin matrix. The material is then rapidly quenched in a water bath, water spray, molten metal bath, or by any other commonly known method to a temperature below approximately 250° C. at a rate exceeding 500 K/second to form a martensitic structure where the iron remains in a supersaturated solution. The material is then subjected to hot or cold working operations and heat treatments at a temperature in the alpha range (less than approximately 800° C.) and preferably between 550° C. to 750° C. for 1 to 2 hours to form $Zr_3Fe$ precipitates that are distributed uniformly intergranularly and intragranularly. The material may be heat treated further at temperatures between 575° C. and 700° C. for between 2 and 12 hours to increase the size of the precipitates. The total heat treatment time may be carried out in a single heat treatment step for the specified time period or may be carried out over multiple heat treatment steps totaling the specified time. The heat treatments allow the diffusion of iron atoms to cluster together to form $Zr_3Fe$ precipitates of fine uniform intergranular and intragranular distribution in the zirconium-tin matrix. Fine uniform intergranular and intragranular distributed precipitates of $Zr_3Fe$ are formed in an alpha zirconium-tin matrix during these alpha phase annealing heat treatment steps.

When the alloys of the present invention have not been beta quenched at the rates and to the temperature specified and then subjected to annealing for the length of time and temperature specified, the second phase particles precipitate non-uniformly at grain boundaries or prior beta-grain boundaries due to a diffusion controlled transformation from the body centered cubic crystal structure beta phase to the closed packed hexagonal crystal structure alpha phase in which a so-called basketweave or parallel plate structure is formed. The diffusion controlled transformation enhances the diffusion and segregation of second phase alloying elements to grain boundaries, prior beta phase grain boundaries, or other nucleation sites in the basketweave or parallel plate microstructure.

The above family of alloys could furthermore contain up to approximately 0.015 weight percent silicon for added strength and grain refinement purposes. In a preferred embodiment, the minimum silicon content should be 0.008 to 0.012 weight percent (80–120 ppm). These alloys could also contain between approximately 0.005 and 0.02 weight percent (50 and 200 ppm) of carbon for grain size control. The oxygen level in the above alloys could be adjusted to fall in the range of 0.09 and 0.22 weight percent (900–2200 ppm) and preferably in the range of 0.11 to 0.14 weight percent (1100 to 1400 ppm) in order to impart low temperature strength to the alloys. The $Zr_3Fe$ precipitates are not affected by the presence of silicon, carbon or oxygen nor is their stability in neutron irradiation fields compromised in any way.

In accordance with a process of the present invention, a zirconium alloy ingot, of a desired composition selected from the composition of the family of alloys of the present invention is formed by melting zirconium and the alloying elements, preferably in a double or triple melt ingot to obtain compositional uniformity. The ingot is made into structural parts for reactor service or into hollow tubes for fuel rod cladding by first hot forging it in the beta phase into a slab or into a round bar (or log and cut into billets) at a temperature of 1000° to 1100° C. for 0.1 to 1 hour. The forging may be completed in the alpha plus beta range or the alpha range in one or a multiple of steps. The slab or the cut bar or billet which may be solid or may have a hole drilled through it is beta quenched by heating to the temperature of 1050° C.±20° C. for 20 to 120 minutes, and then rapidly quenched to a temperature below 250° C. at a rate greater than or equal to about 500K per second. In order to facilitate obtaining high quench rates, the beta quenching step may be carried out on thin cross section parts at an intermediate fabrication stage between ingot and final product.

For the fabrication of structural parts for nuclear service, the beta quenched slab is hot rolled at less than 750° C. for sheet production. The structural part is brought to final dimension by subsequent cold rolling steps with intermediate annealings below 700° C.

For the fabrication of fuel rod cladding, the beta quenched billet is machined and prepared for extrusion for a single walled cladding tube or for co-extrusion of a multiple walled, lined, or composite cladding tube. For the manufacture of a single walled cladding tube, the beta quenched billet is heated to between 600° and 750° C. and extruded to form a hollow having an outside diameter ranging from approximately 40 to 100 mm. For a multiple walled cladding tube, a composite cladding tube, or a lined cladding tube, a hollow billet of the material of the inner wall or lining is inserted into another hollow billet of a material of the outer wall. Either one or both of these hollow billets may comprise a beta quenched billet formed of an alloy of the present invention. The two assembled hollow billets can be welded together in place using electron beam welding and then heated to between 600° and 750° C. and co-extruded to form a hollow having an outside diameter ranging from 40 to 100 mm. The extruded hollow tube or co-extruded composite or lined hollow tube is then optimally annealed by heating for several hours to 700° C. or below depending on the desired precipitate size. The hollow tube or co-extruded hollow tube is then subjected to a series of cycles of alternating pilgering and annealing steps at or below 700° C. to form a tube of approximately 10 mm in diameter. After the last cycle of pilgering, the tubing is given a final heat treatment or anneal of 700° C. or below according to the desired condition of the tube as stress relieved, partially recrystallized or recrystallized.

Figure 4:
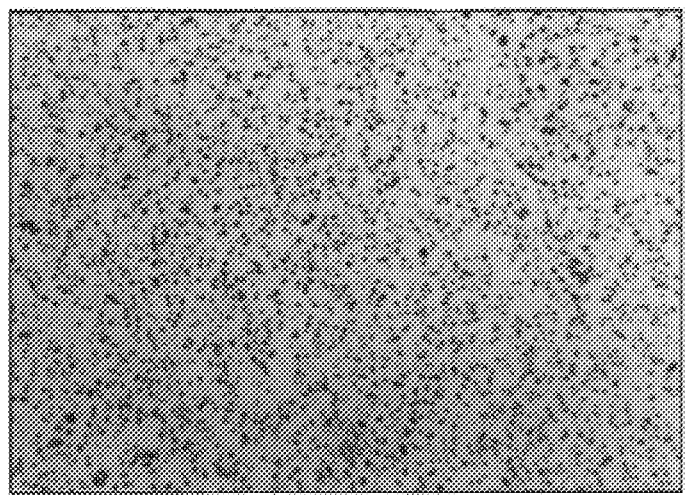
FIG. 4 shows a transmission electron microscopy photomicrograph showing the uniform intergranular and intragranular distribution of precipitates produced in accordance with the present invention in a zirconium-tin-transition metal alloy.
Figure 5:
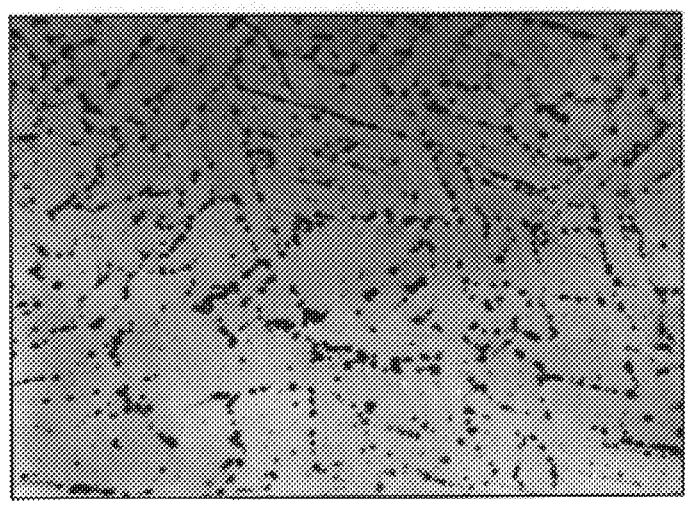
FIGS. 5 and 6 show transmission electron microscopy photomicrographs illustrating the non-uniformity of precipitate distribution at grain boundaries, and at grain boundaries and former beta grain boundaries for an alloy with the same composition as in FIG. 4.
Figure 6:
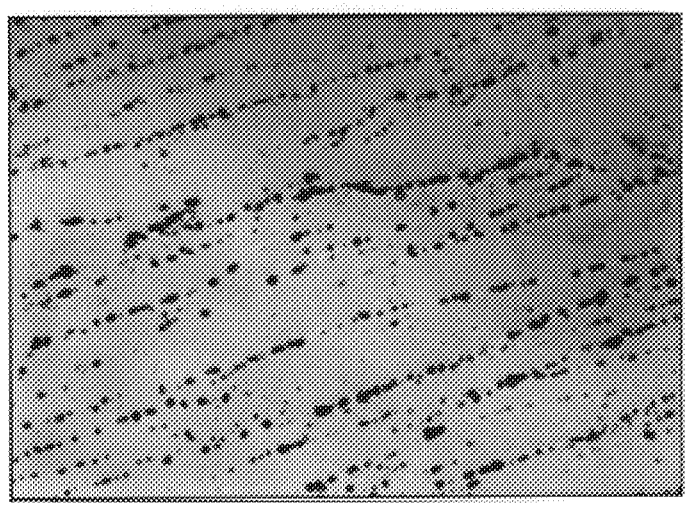

The uniform intergranular and intragranular distribution of intermetallic precipitates that is obtained in the zirconium alloys containing tin and iron of the present invention by appropriate processing steps and heat treatments is shown in FIG. 4. FIG. 4 is a transmission electron microscopy photomicrograph showing in accordance with the present invention the typical uniform intergranular and intragranular distribution of inter-metallic precipitates obtained by rapidly quenching the alloy at a rate exceeding 500K/second, from a temperature in excess of 1000° C. (i.e., the beta range) to martensitically transform the alloy, followed by an 8 hour anneal at 750° C. to precipitate the intermetallic second phase particles. FIGS. 5 and 6 are transmission electron microscopy photomicrographs illustrating the precipitate distribution resulting from quenching the alloy at lower rates (respectively 50K/second and 5K/second) followed by 8 hour anneals at 750° C. As observed on the micrographs, second phase particles in these examples precipitate non-uniformly at grain boundaries (FIG. 5) or at grain boundaries and prior beta-grain boundaries (FIG. 6) due to a diffusion controlled transformation from body centered cubic crystal structure beta phase to closed packed hexagonal crystal structure alpha phase. The diffusion controlled transformation enhances the diffusion and segregation of second phase alloying elements to grain boundaries, prior beta phase grain boundaries, or other nucleation sites and leads to a non-uniform distribution of intermetallic precipitates.

It may be desirable to also impart the cladding tube or structural part made of the alloy of the present invention with increased resistance to radiation induced growth. In accordance with another aspect of the present invention, a beta anneal at a temperature greater than approximately 1000° C. for a period of up to half an hour and preferably 2 to 15 minutes followed by quenching in air or water at a controlled rate above 50K/sec can be used to produce material with a random texture to reduce axial cladding growth and axial growth of fuel assembly and reactor core structural members which otherwise can occur during high burnup. The beta anneal may be performed before or after the final cold work or pilgering step; or between the intermediate cold work or pilgering steps. If the beta anneal is performed after the final cold work step, it may be followed by an alpha anneal at a temperature between 575° and 700° C. to provide the material with the desired precipitate size.

In many applications, it may be desirable to produce a precipitate size in the alloy material in order to optimize corrosion resistance to different high temperature aqueous environments. In pressurized water reactors in which the coolant/moderator environment is an oxygen-free chemistry, nuclear fuel rod cladding, structural parts for nuclear assemblies, and reactor core components are typically made of alloy materials having large precipitates. In a preferred embodiment, the precipitate size is from 100–300 nm and preferably 200 nm for the alloy formed into nuclear fuel rod cladding, structural parts for nuclear fuel assemblies, and reactor core components for application in a pressurized water reactor. In boiling water reactors in which the coolant moderator environment is an oxygen-rich chemistry, nuclear fuel rod cladding, structural parts for nuclear fuel assemblies, and reactor core components are typically made of alloy materials having smaller precipitates from 40–100 nm and preferably 80 nm.

While the foregoing description and drawings represent the preferred embodiments of the present invention, it will be apparent to those skilled in the art that various changes and modifications may be made therein without departing from the true spirit and scope of the present invention.

We claim:

1. Corrosion resistant nuclear reactor components comprising an alloy consisting essentially of 0.3 to 1.8 weight percent tin, 0.1 to 0.65 weight percent iron, 0.003 to 0.015 weight percent of silicon, 0.005 to 0.02 weight percent carbon, and 0.09 to 0.22 weight percent oxygen, the balance of said alloy being essentially nuclear grade zirconium with incidental impurities and imparted with a microstructure of $Zr_3Fe$ second phase precipitates distributed uniformly intragranularly and intergranularly forming radiation resistant second phase precipitates in the alloy matrix so as to result in increased resistance to aqueous corrosion to that of Zircaloy when irradiated to high fluence, and wherein the second phase $Zr_3Fe$ precipitates in said alloy have an average diameter of from about 40 to 300 nm.

2. A fuel rod cladding tube for a nuclear reactor fuel rod comprised of an alloy consisting essentially of 0.3 to 1.8 weight percent tin, 0.1 to 0.65 weight percent iron, the balance of said alloy being essentially nuclear grade zirconium with incidental impurities and having a microstructure of $Zr_3Fe$ second phase precipitates distributed uniformly intragranularly and intergranularly forming radiation resistant second phase precipitates in the alloy matrix so as to result in increased resistance to aqueous corrosion to that of Zircaloy when irradiated to high fluence.

3. The nuclear fuel rod cladding tube as in claim 2 wherein the alloy further consists essentially of from 0.008 to 0.015 weight percent of silicon, from 0.005 to 0.02 weight percent carbon, and from 0.09 to 0.22 weight percent oxygen.

4. The nuclear fuel rod cladding tube as in claim 3 wherein the precipitates in said alloy have an average diameter of from about 40 to 300 nm.

5. Zirconium alloys for use in an aqueous environment subject to high fluence of a water reactor and characterized by improved corrosion resistance, the alloys consisting essentially of 0.3 to 1.8 weight percent tin, 0.1 to 0.65 weight percent iron, the balance of said alloys being essentially nuclear grade zirconium with incidental impurities and having a microstructure of $Zr_3Fe$ second phase precipitates distributed uniformly intragranularly and intergranularly to form radiation resistant second phase precipitates in the alloy matrix so as to result in increased resistance to aqueous corrosion to that of Zircaloy when irradiated to high fluence.

6. The alloy in claim 5 further consisting essentially of up to about 0.015 weight percent of silicon, from 0.005 to 0.02 weight percent carbon, and from 0.09 to 0.22 weight percent oxygen.

7. The alloy in claim 5 wherein the beta-niobium second phase precipitates in said alloy have an average diameter of from about 40 nm to 300 nm.

8. The alloy as in claim 7 wherein the average diameter is from about 100 to 300 nm.

9. The alloy as in claim 8 wherein the average diameter is about 200 nm.

10. The alloy as in claim 7 wherein the average diameter is from about 40–100 nm.

11. The alloy as in claim 10 wherein the average diameter is about 80 nm.

12. The alloy as in claim 9 further consisting essentially of up to 0.015 weight percent of silicon, 0.005 to 0.02 weight percent carbon, and 0.09 to 0.22 weight percent oxygen.

13. The alloy as in claim 11 further consisting essentially of up to 0.015 weight percent of silicon, 0.005 to 0.02 weight percent carbon, and 0.09 to 0.22 weight percent oxygen.

14. A structural part for a nuclear reactor fuel assembly comprising a zirconium alloy consisting essentially of from 0.3 to 1.8 weight percent tin, from 0.1 to 0.65 weight percent iron, the balance of said alloy being essentially nuclear grade zirconium with incidental impurities and having a microstructure of $Zr_3Fe$ second phase precipitates distributed uniformly intragranularly and intergranularly forming radiation resistant second phase precipitates in the alloy matrix so as to result in increased resistance to aqueous corrosion to that of Zircaloy when irradiated to high fluence.

15. The structural part as in claim 14 wherein the zirconium alloy further consists essentially of from 0.008 to 0.012 weight percent of silicon, from 0.005 to 0.02 weight percent carbon, and from 0.09 to 0.22 weight percent oxygen, and wherein the second phase beta niobium precipitates in said alloy have an average diameter of from about 40 to 300 nm.

* * * * *